Aug. 13, 1968  A. J. LANDE ET AL  3,396,849
MEMBRANE OXYGENATOR-DIALYZER
Filed May 10, 1966

INVENTORS
ARNOLD J. LANDE
CLARENCE WALTON LILLEHEI

Braddock + Burd
ATTORNEYS

INVENTORS
ARNOLD J. LANDE'
CLARENCE WALTON LILLEHEI

Braddock & Burd
ATTORNEYS

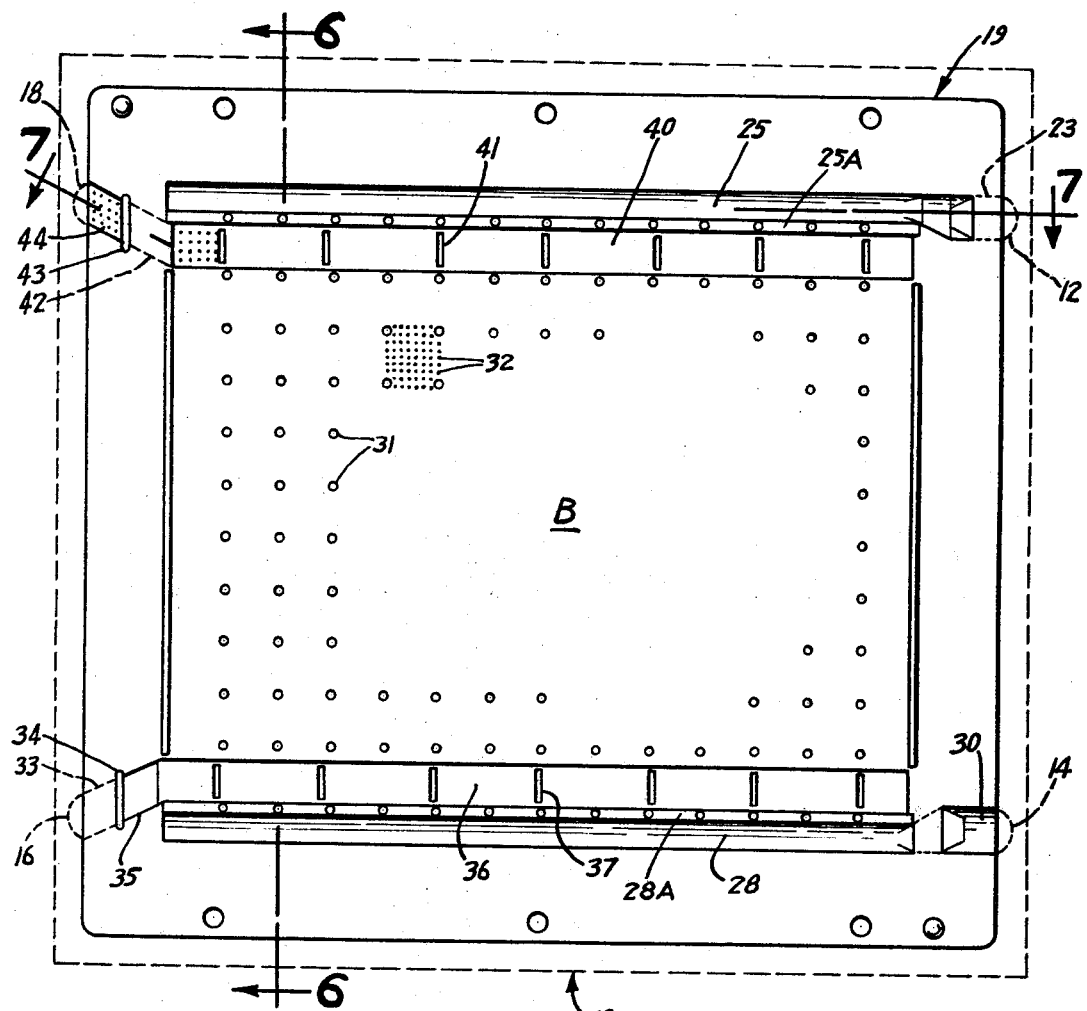
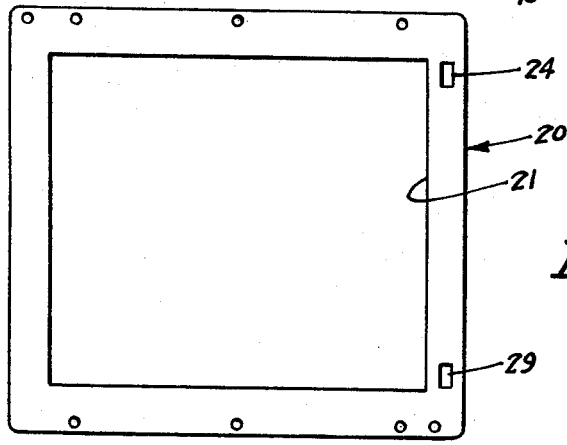

Aug. 13, 1968   A. J. LANDE ET AL   3,396,849
MEMBRANE OXYGENATOR-DIALYZER

Filed May 10, 1966   6 Sheets-Sheet 4

INVENTORS
ARNOLD J. LANDE'
CLARENCE WALTON LILLEHEI

Braddock & Burd
ATTORNEYS

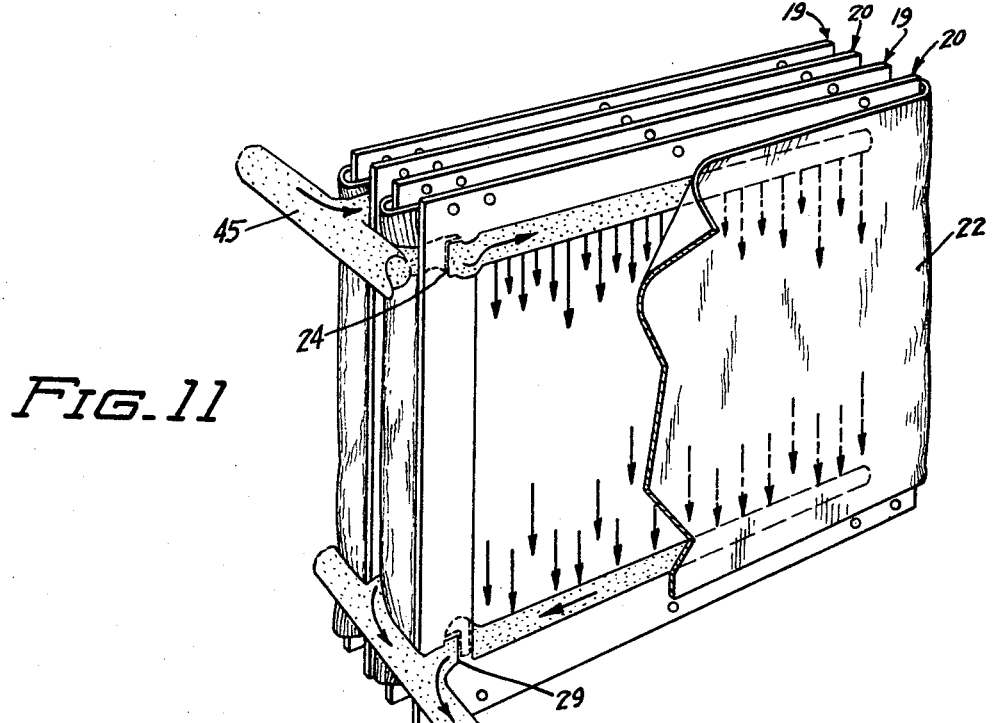
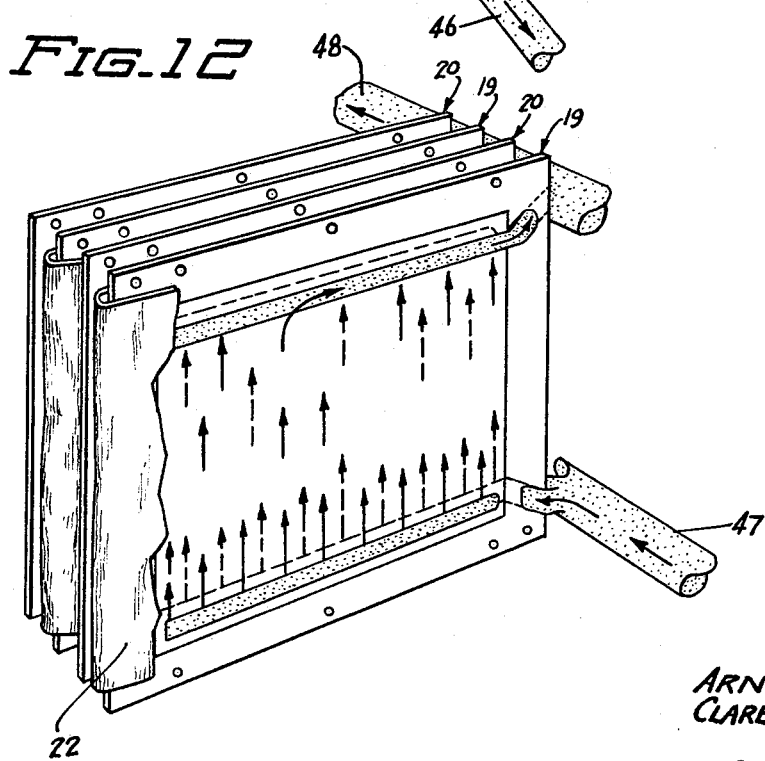

United States Patent Office 3,396,849
Patented Aug. 13, 1968

3,396,849
MEMBRANE OXYGENATOR-DIALYZER
Arnold J. Lande, Minneapolis, and Clarence Walton Lillehei, St. Paul, Minn., assignors to The Regents of The University of Minnesota, Minneapolis, Minn., a corporation of Minnesota
Filed May 10, 1966, Ser. No. 549,023
10 Claims. (Cl. 210—321)

ABSTRACT OF THE DISCLOSURE

A liquid-gas or liquid-liquid fluid exchange device for use as an oxygenator or dialyzer and comprising a stack of alternating membrane support plates and spacers separating the support plates and an elongated pleated membrane extending alternately around each support plate and spacer. The device is provided with channel means for introducing one fluid as a thin film on one side of the membrane in the space between two membrane layers and for introducing a different fluid on the other side of the membrane in the space between the membrane and support plate and for discharging the fluids.

---

This invention relates to a liquid-gas, or liquid-liquid, or heat exchange device utilizing a permeable membrane or other thin sheet. The invention relates especially to such a device used for oxygenating and pumping blood in an extra- or intercorporeal circulation system for temporarily assuming or assisting the functions of the heart and lungs in a human being or other animal, or for use as an artifical kidney or liver or heat exchanger. The device of the present invention is characterized by its means for supporting and manifolding multiple short parallel films of blood between ultra thin permeable membranes or other films for exposure to an oxygenating gas or dialysis liquid or heating or cooling medium through the membrane or other film.

Broadly stated, the membrane fluid exchange device according to the present invention comprises a plurality of stacked generally flat rigid membrane support plates, spacer means to hold each adjacent pair of plates closely spaced apart, a thin membrane, either permeable or not depending upon use of the device, disposed between each plate and each spacer, each plate having a plurality of projections to hold the membrane spaced from the surface of the plate, means for introducing one fluid for flow as a thin film in one direction between the two layers of membrane between each adjacent pair of plates and means for introducing another fluid for flow in either the same or the opposite direction through the space between each membrane support plate and the adjacent membrane layer.

By way of background, the first workable artifical kidney was developed about 25 years ago. This device consisted of a long cellophane sausage casing through which the blood passed and which was wound as a spiral about a central support. Subsequent models now in wide use are wound layer upon layer over a central core. Because the resistance to blood flow over the 25 foot or so length of this casing is necessarily high, it is necessary to wind the sausage casing loosely to permit a relatively thick film of blood, in order to bring the resistance of the device down to a reasonable level. This coiled tubing is immersed in a dialysis liquid. Whereas the dialysis liquid has to pass only a few inches up between the winding of the sausage casing, the blood has to travel the full distance of about 25 feet around and around from the center of the coil to the periphery. This device is still the most generally used unit for hemodialysis. It has the advantage that it can be manufactured for a single use and then disposed of. It has the disadvantage of requiring a relatively large volume of donor blood to initially fill the artificial kidney. Safe operation requires close attention and much time. A large amount of dialysate is required and the unit is relatively expensive. Devices utilizing shorter flow paths are available, but require laborious disassembly, cleaning, sterilizing and reassembly after each use.

In the related area of blood oxygenation, membrane oxygenators for use during cardiac surgery have been proposed for as long as 15 years. The devices available have never found wide acceptance. Instead, versions of the bubble oxygenator and film oxygenators continue to dominate the field, although there are numerous indications that the separation of blood and oxygen by a permeable membrane, as in the lungs, is much less traumatic to several components of blood. The proposed membrane oxygenators have been subject to disadvantages similar to those of the artificial kidney.

The present invention is directed to fulfilling the acute need for a low priming volume disposable membrane oxygenator-dialyzer. This unit is characterized by an elongated permeable membrane of extreme thinness and great strength, pleated and alternating between a plurality of rigid membrane supports stacked together into a compact assembly ⅕ the size of any similar unit previously envisioned. The pleated membrane allows for manifolding blood and oxygen or dialysis fluid into parallel thin films without potential mixing. The device is characterized by truly uniform blood film thickness, by the rigid membrane support components and by elimination of any possibility of short circuiting or leaking.

The invention is illustrated in the accompanying drawings in which the same numerals are used to identify corresponding parts and in which:

FIGURE 3 is a similar plan view on an enlarged scale of the opposite side (face B) of one of the rigid membrane supports, shown with its housing or casing in broken lines;

FIGURE 4 is a plan view on a reduced scale of a spacer component inserted between the membrane supports;

FIGURE 11 is a fragmentary perspective view showing the components of the oxygenator-dialyzer in their assembled relationship but spaced widely apart, to illustrate the flow pattern of blood through the unit;

FIGURE 12 is a similar view showing the flow of oxygen or dialysate through the unit.

Figure 1:
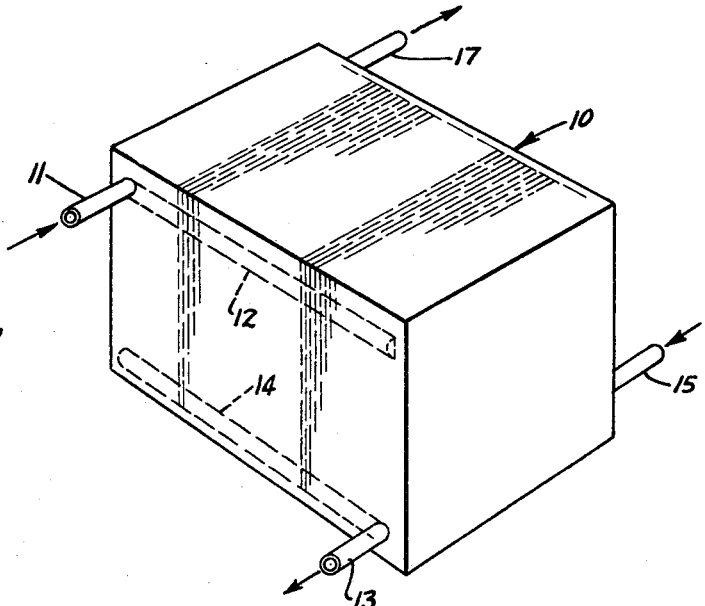
FIGURE 1 is an isometric view of the compact small rigid membrane oxygenator-dialyzer according to the present invention.

Referring now to the drawings, it will be seen that the oxygenator-dialyzer unit, indicated generally at 10, is a compact block-life structure encasing a plurality of stacked membrane supports and spacers around which a permeable membrane is pleated, as described in greater detail below. For convenience the unit will be described with particular reference to oxygenation of blood as practiced during cadiac surgery, although it will be understood that the same structure is utilized in an artificial kidney and other uses.

The oxygenator includes a blood inlet 11 which communicates directly with an internal channel 12 which functions as a manifold to distribute the blood along the length of the oxygenator unit and which in turn communicates with channels in the edges of the membrane supports, as further described below. The unit is provided with a blood outlet 13 which communicates directly with an internal collector channel 14 which collects the oxygenated blood by communicating with outlet channels in the edges of the membrane support members.

The oxygenator also includes an oxygen inlet 15 which communicates with an internal channel 16 (FIGURE 3) which functions as a manifold for distribution of oxygen along the length of the unit and a carbon dioxide outlet 17 which in turn communicates with an internal $CO_2$ collector channel 18 (FIGURE 3). The internal channels 16 and 18 connect to channels in the membrane supports. As illustrated, the gas flow is countercurrent to the blood flow, but optionally the blood and gas may flow in the same direction.

Figure 2:
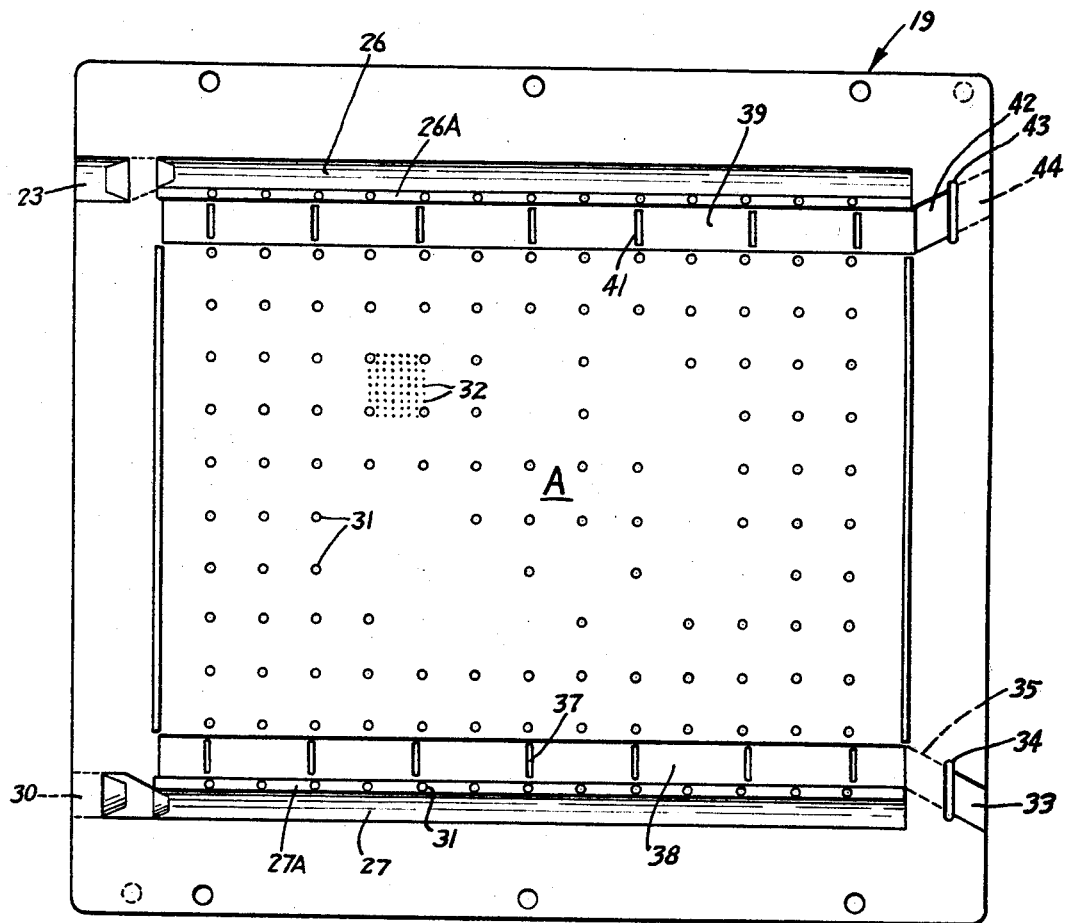
FIGURE 2 is a plan view on an enlarged scale of one side (face A) of one of the rigid membrane supports.

Referring now to FIGURES 2 and 3 there is shown in detail the structure of the membrane support components of the oxygenator. The membrane supports, indicated generally at 19, are in the form of rigid rectangular generally flat plates whose opposite faces are molded to form cavities which define flow channels and to form membrane support elements. As one example, each plate may be about 3½ by 3¾ inches (9 by 9½ cm.) and about 1/16 to 3/32 inch (1½ mm.) thick. The edges of each plate frame a central working area which may be, for example, about 2¾ by 3⅛ inches (7 by 8 cm.). The spacer member indicated generally at 20 and shown in FIGURE 4 has the same outside dimensions as the support plates 19 and frames an opening 21 of the same size as the overall working area of the membrane support plates. The spacer may be about 1/32 to 3/64 inch (1 mm.) thick.

Because the repeating functional unit of the oxygenator device is composed of a pair of membrane support plates 19 disposed in face-to-face relation with a spacer member 20 in between, this can best be visulaized by considering FIGURES 2 (face A) and 3 (face B) in side-by-side relation as the pages of a book and adapted to be closed on one another in the same manner but with the spacer member of FIGURE 4 interposed and with a thin flexible permeable membrane 22 interposed between one face of each of the membrane support plates and each face of the spacer. The blood flow is at all times between the two membrane surfaces embracing the spacer 21, but the membrane is extremely thin, resilient and deformable and is forced by pressure of the blood into certain of the cavities in the faces of the plates 19 so that those cavities define channels between the membrane which guide and direct the flow of blood. The blood is at no time in direct contact with the membrane support plates.

Face A of each support plate 19 thus includes a short edge cavity or recess 23 the inner end of which is disposed to be in registry with one end of an opening 24 in spacer 20. The opposite end of opening 24 is then disposed to be in registry with the end of a narrow elongated cavity 25 extending across the top on the opposing face B of the adjacent facing support plate. A mating cavity 26 extends across the top of the first face (face A, FIGURE 2) of the support plate. The elongated channel formed between the opposing faces when the two plates are stacked provides a space in which the thin flexible membrane may be deformed outwardly under pressure of flowing blood and so form the membrane into a channel through which the blood is distributed.

A corresponding pair of cavities adapted to define a blood collection channel are disposed across the bottom of the membrane support plate, cavity 27 being on one face (face A, FIGURE 2) and cavity 28 being on the opposite face (face B, FIGURE 3). One end of cavity 27 lies in registry with one end of an opening 29 in spacer 20 in the assembled unit and the opposite end of opening 29 is disposed so as to be in registry with the inner end of a recess 30 in facing membrane support plate (FIGURE 3) and defining a short blood outlet channel. Again blood does not flow through the channel created between cavities 27 and 28, but between the channel formed in the flexible membrane distended to fill out that cavity. The blood inlets defined by recesses 23 communicate with the manifold channel 12 extending the length of the assembled oxygenator unit (FIGURE 1) adjacent the top edge and the blood outlet defined by recesses 30 communicate with the collection channel 14 disposed along the length of the oxygenator unit along the bottom edge.

Figure 8:
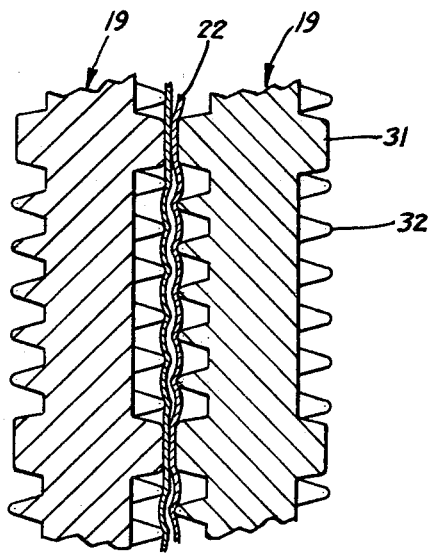
FIGURE 8 is a fragmentary section, further enlarged, showing the manner of support of the membrane between two adjacent membrane supports.
Figure 9:
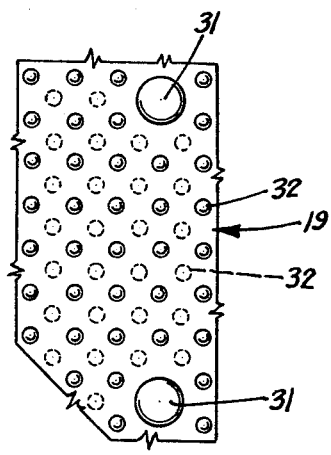
FIGURE 9 is a greatly enlarged fragmentary plan view showing the arrangement of the myriad of individual membrane supporting elements of the rigid membrane supports of the oxygenator-dialyzer.

Between cavities 25–26 and cavities 27–28 the opposite sides of the folded flexible membrane 22 are supported by a plurality of evenly spaced and mated pedestals 31 and a myriad of Bleumle cones 32 disposed between the several pedestals. The cones 32 are evenly spaced but are off-set as between one face of the support plate and the other, as best seen in FIGURES 8 and 9. Adjacent each cavity 25–28 there is a slight ridge 25A–28A on the side toward the cone field. The blood flows under low resistance through the channels formed between the facing cavities. The resistance ridges cause a higher resistance flow through the spaces between the pedestals. Because of the vast number of cones on each side of each membrane support, for convenience only a few of these are shown. It will be understood, however, that on membrane support plates of the size indicated there are 156 pedestals and approximately 7000 cones on each side.

The face-to-face mating pedestals insure constant spacing between the membrane surfaces, the amount of spacing being related to the height of the pedestals and the thickness of the spacer member. The cones rigidly support the membrane on both sides at myriad points. The cones at the blood inlet end along the top of each membrane support plate where the pressure of the blood is greatest, are desirably about 0.002 inch slightly higher than at the other end in order to make maximum utilization of countercurrent flow possible by providing constant fluid film thickness even with the exaggerated pressure drops encountered during countercurrent flow. The blood flow is retained between the two surfaces of the pleated membrane, supported all of the time by the cones and pedestals.

The oxygen circulates through the spaces between the membrane and the membrane supports in either the same direction or, as illustrated, in countercurrent flow. Each membrane support plate 19 in the edge on the side opposite from the blood inlet and outlet recesses is provided with a short shallow oxygen inlet channel 33 which communicates with a narrow slot 34 or similar opening leading a short shallow channel 35 on the opposite face of the plate. Channel 35 leads directly to a shallow elongated oxygen distribution channel 36 which extends across the width of plate 19 adjacent the bottom edge parallel to and immediately adjacent to recess 28 defining the blood collection channel. A plurality of narrow slots 37 or similar openings through the plate communicate with a corresponding shallow oxygen distribution channel 38 on the opposite face of plate 19. This permits uniform distribution of the oxygen introduced through channel 33 on both sides of membrane support plate 19.

The gas is passed under pressure through the myriad passages between the cones 32 and pedestals 31 between the outer surface of membrane 22 and the face surface of the membrane support plate. The exchange of oxygen for carbon dioxide in the blood takes place through the exposed membrane surface. The carbon dioxide is forced by the flow of oxygen on through the space between the membrane and membranes support plate to a pair of shallow $CO_2$ collection channels 39 and 40 on opposite sides of the plate extending across the top, parallel to and adjacent to the recesses 25 and 26 defining the blood distribution channel. The $CO_2$ collection channels communicate through a plurality of slots 41 or similar openings. One end of channel 39 communicates directly with a short discharge channel 42 which in turn communicates through a slot 43 or similar opening with a discharge recess or channel 44.

Oxygen inlet channels 33 communicates with an oxygen distribution channel or manifold 16 extending lengthwise of the assembled oxygenator unit and communicating with each of the assembled plate, membrane and spacer units. Similarly $CO_2$ discharge channels 44 communicate with a $CO_2$ collection channel 18 extending lengthwise of the oxygenator unit and discharging through outlet 17. Channels 33, 35, 36, 38, 39, 40, 42 and 44 are preferably all provided with cones 32 to support the membrane 22 away from the plate surface to facilitate free flow of gas through the unit. Resistance ridges are also desirably provided adjacent each of channels 36, 38, 39 and 40 between the channels and main cone field.

It will be noted that the passage of blood through slots 24 and 29 in spacer 20 from one side of the spacer to the other and passage of gas through slots 34 and 43 from one side of plate 19 to the other insures that the border of each face of membrane support plate 19 presents a continuous flat planar surface surrounding the working area of each face of said plate. This insures that when membrane is disposed over each face of membrane support plate 19 and overlaid with the flat planar surface of spacer 20 and slightly compressed in assembly, the membrane functions as a gasket to insure a leakproof assembly.

Figure 10:
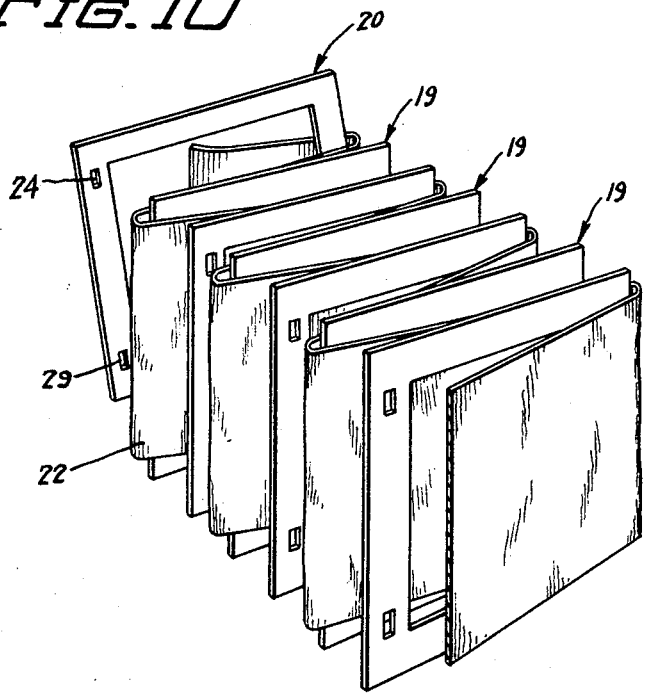
FIGURE 10 is a perspective schematic illustration of the manner in which the membrane supports and spacers are assembled.
Figure 5:
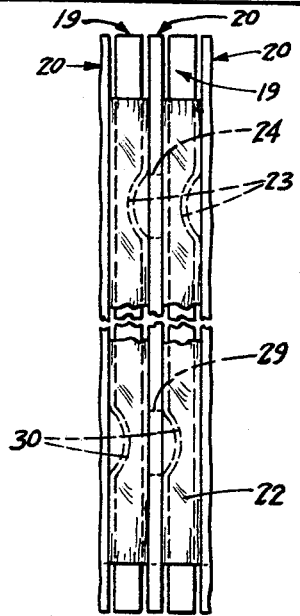
FIGURE 5 is a greatly enlarged fragmentary end elevation of a set of membrane supports and spacer.
Figures 6, 7:
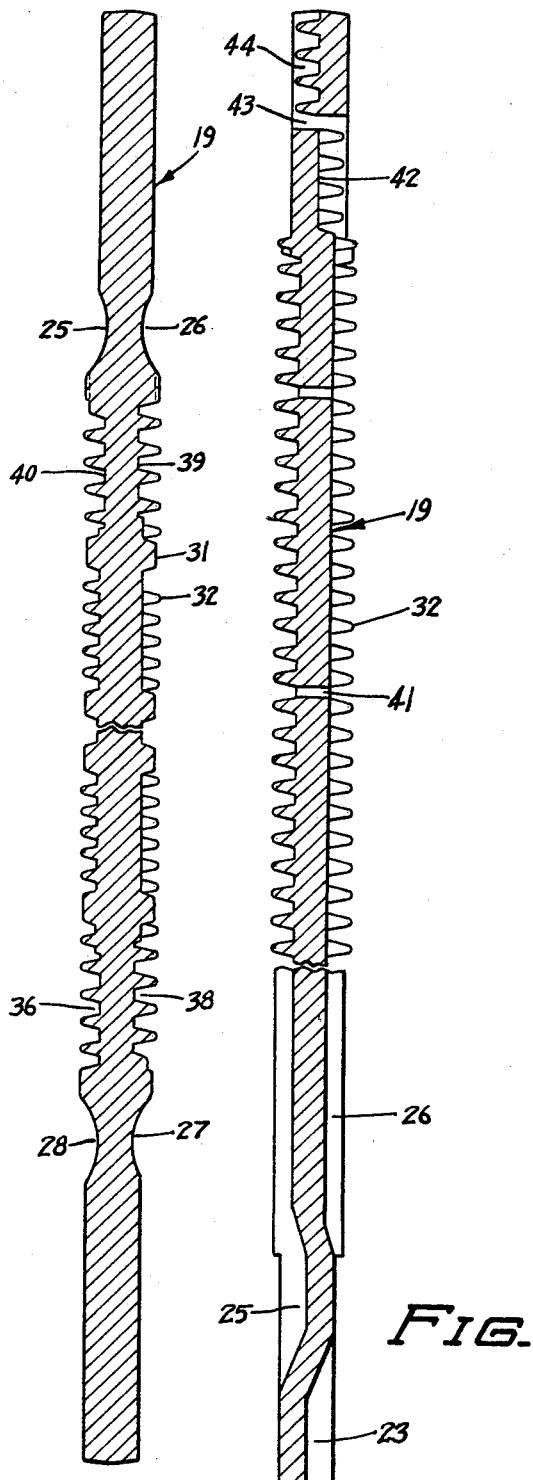
FIGURE 6 is a greatly enlarged section on the line 6—6 of FIGURE 3 and in the direction of the arrows.
FIGURE 7 is a greatly enlarged section on the line 7—7 of FIGURE 3 and in the direction of the arrows.

The manner in which the components are assembled into an oxygenator is shown in FIGURE 10. Membrane supports 19 are alternated with spacers 20. The permeable membrane 22 is disposed in an Esmond pleat passed in a circuitous path so as to provide a membrane layer between the faces of each adjacent pair of components. The membrane passes over the membrane supports 19 around the end containing the blood inlet and outlet recesses 23 and 30 and extends around the spacers 20 at the edge opposite from that including the passages 24 and 29. In this manner the blood flow recesses 23 and 30 are exposed on one side of the assembled unit (as best seen in FIGURE 5) for communication with channels 12 and 14, respectively, and gas flow recesses 33 and 44 remain exposed on the opposite side of the assembled unit for communication with channels 16 and 18. The assembled unit need not be, but if desired may optionally be suitably encased, as in silicone rubber or the like, or otherwise enclosed in a housing.

Membrane 22 must be thin and flexible. For oxygenation it must be permeable to the passage of gases, such as oxygen and carbon dioxide, while remaining impermeable to the passage of liquids, such as blood. For dialysis the membrane must permit diffusion of blood impurities by liquid-liquid exchange. One exemplary material for oxygenation is a three ply laminated membrane of silicone rubber of approximately 1 mil thickness manufactured by the General Electric Company. For dialysis cellophane or other conventional dialysis membranes may be used. For heat exchange metal foil, stainless steel or aluminum or the like, may be used as the membrane.

The basic operation of the oxygenator unit according to the present invention is shown schematically in FIGURES 11 and 12. FIGURE 11 shows the blood flow, while FIGURE 12 shows countercurrent gas flow. As is understood, in a typical cardiac operation the patient's heart is first exposed and the two large veins at the right side of the heart which return the body blood to the heart are loosely looped with tape ready to be tied. Catheters to the great veins of the heart are inserted through a slit in the right atrium and a catheter to a systemic artery is inserted. The oxygenator is primed with the required amount of donor's whole blood or blood substitute, which in this instance is minimal. The tube from the veins of the patient passes through a standard blood pump and is connected to the blood inlet tube 11 of the oxygenator. The blood discharge tube 13 is connected through a similar standard blood pump to return the oxygenated blood to the patient. This procedure is illustrated generally in DeWall-Lillehei Patent No. 2,854,002. The device may also be used under non-operative circumstances utilizing peripheral veins and arteries over extended periods of time without the necessity of opening the chest.

With the oxygenator thus connected to the circulatory system of the patient, the blood pumps are turned on and the tapes looping the blood vessels are tightened. The heart, still beating, empties of blood. The venous blood then, instead of going through the heart and lungs, passes through the blood pump into the blood inlet 11 of the oxygenator and flows along the manifold channel 12 in a stream 45 indicated schematically in FIGURE 11. This blood under pressure passes into the several blood inlet recesses 23, in the space between the spacer 20 and membrane 22 which is deformed by the blood pressure to fit into that recess.

Then the blood passes through passage 24 in each of the spacers 20 and into the elongated channel formed between the adjacent films of the pleated membrane defined by the cavities 25 and 26 of the facing surfaces of two adjacent membrane support plates 19, held slightly spaced apart by means of the spaced 20 and pedestals 31. The blood from that distribution channel flows as a thin film between the membrane surfaces, supported by the cones 32, as best illustrated in FIGURE 8. In the course of this passage the thin film of blood is exposed on opposite sides through the membrane to oxygen and exchanges its carbon dioxide for oxygen.

The oxygenated blood is collected in a channel formed between the membrane films as distended to fit the cavities 27 and 28 in the same facing adjacent pair of membrane support plates. This stream of oxygenated blood 46 then passes out through passage 29 in spacer 20 and through the channel defined between recess 30 and the next adjacent membrane support plate and the spacer. These several streams of oxygenated blood, one from between each adjacent pair of membrane supports, is collected in the channel 14, discharged out through the outlet 13, and pumped back to the arterial system of the patient.

As seen schematically in FIGURE 12, the oxygenation of the blood occurs as the result of contact through the membrane between the blood and oxygen introduced into the oxygenator in countercurrent flow. Thus, a stream of oxygen 47 is introduced into inlet 15 and distributed along the manifold 16 from which it has direct entry into the channels 33 in each of the membrane support plates 19. The oxygen then passes through slot 34, channels 35 and 36, slots 37 and channel 38 and thus is uniformly distributed on both sides of the membrane support in the spaces between the support surface and the membrane. In the course of its passage through these spaces, in direction countercurrent to the simultaneous flow of blood between the supported membranes, the oxygen displaces part of the carbon dioxide in the blood and this mixture of carbon dioxide and oxygen is collected in channels 39 and 40, passing through slots 41, and out through channels 42, slot 43 and channel 44 to the $CO_2$ collector channel 18 and discharged through $CO_2$ outlet 17.

A unit as described, with the dimensions given as exemplary, supports a half square meter of membrane and provides 50 short (5 cm.) parallel 3 inch wide blood flow paths, each of which is enclosed between two layers of membrane. Where greater capacity is needed, two or more assemblies may be used in parallel or the unit may be assembled with a greater number of stacked plates. Although described with particular reference to oxygenation of blood it will be understood that the overall functioning of the device is generally similar when a dialyzing liquid is pumped in substitution for the oxygenating gas.

The same unit has potential for pumping blood. With the inclusion of two valves in the blood stream and pressure pulsation of the oxygen, a one unit self-contained pump-oxygenator is possible. Such a unit may be implanted. The unit likewise has potential as an artificial liver. In this instance the blood stream of a healthy animal is routed through the channels otherwise used for oxygen or dialysate. The device may be used as a heat exchanger utilizing a film of extremely thin heat conductive material. Blood may be heated or cooled, or oxygen may be heated or cooled by using a suitable heating or cooling fluid flow on one side of the membrane.

Figure 13:
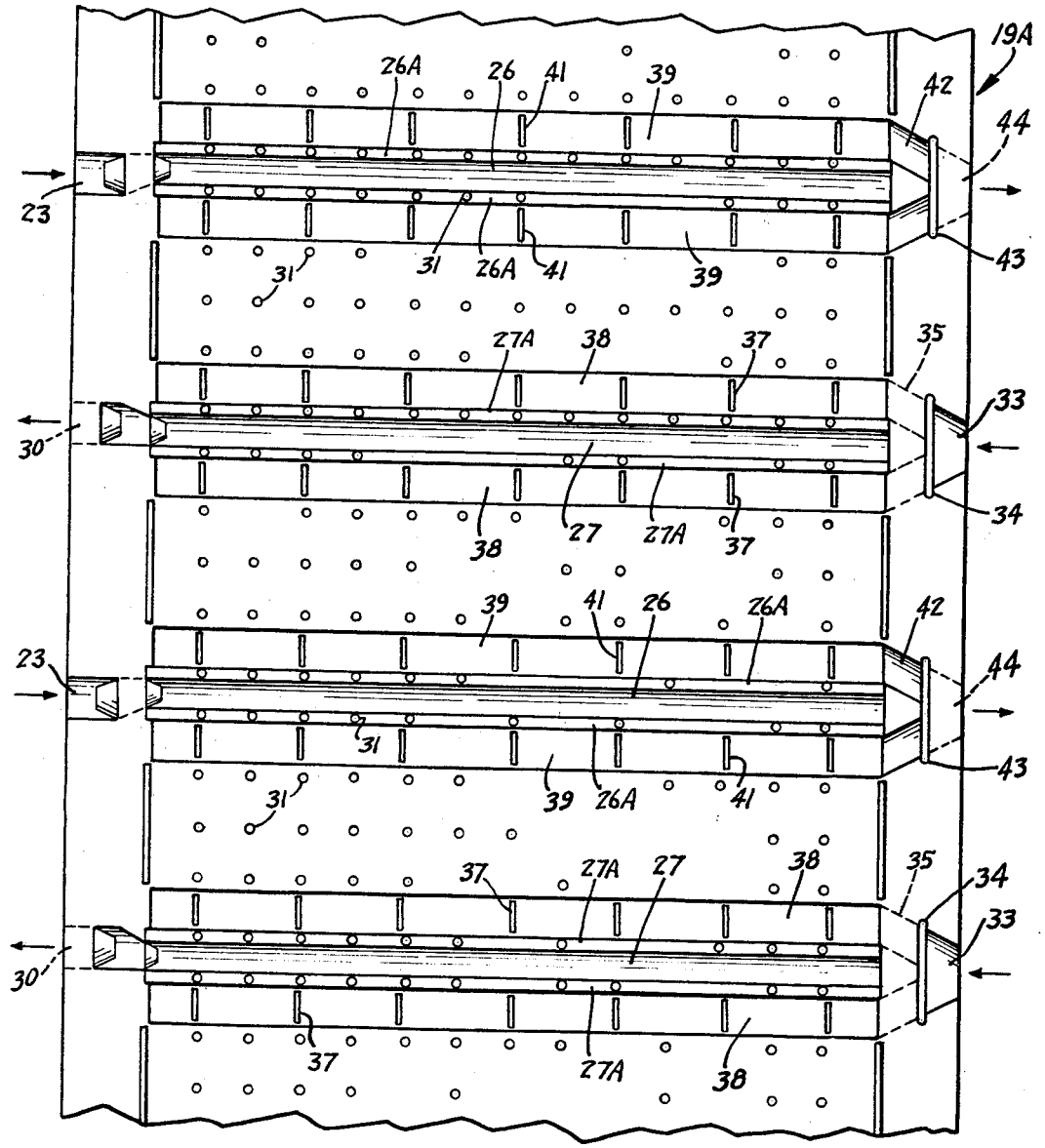
FIGURE 13 is a greatly enlarged fragmentary plan view of a modified membrane support.

In FIGURE 13 there is shown an alternative form of membrane support plate, indicated generally at 19A. The same component parts are correspondingly identified. One face of the plate 19A is provided with a plurality of recesses 23 and narrow elongated cavities 26. As already described, blood introduced through the channel defined by each recess 23 flows into an elongated channel defined by cavity 26 and a mating cavity in the next adjacent membrane support plate. According to the modified form of construction, the blood from that channel flows two directions into one of two cone fields. The blood flow is over a shorter flow path and the blood is collected in a channel defined between one of a pair of elongated cavities 27 as shown and mating cavities in the next adjacent plate and discharges out through either one of blood outlet recesses 30.

The oxygen is introduced through inlet channels 33 and passes through slots 34 to channels 35 on the opposite side of the plate, generally in the manner already described. Then, the mixture of carbon dioxide and oxygen is collected for discharge out through a common discharge channel 44.

The overall construction of the gas distribution and collection channels and pedestal and cone fields are the same as already described except that the blood flow paths through the cone fields are shorter and there are multiple flow paths. The venous blood is introduced through one channel and the oxygenated blood from it is collected through two separate channels, whose flows are combined for circulation back to the body of the patient.

Desirably, the modified form of membrane support plate is constructed so as to provide a plurality of the functional units as illustrated in repeating pattern in each plate so as to provide for multiple flow of blood into and out of the space between each pair of adjacent plates with corresponding multiple inflow of oxygen and outflow of carbon dioxide and oxygen mixture. The overall functioning of the modified unit is identical but the flow paths are materially shortened.

This invention is based at least in part upon work done under a contract or grant from the United States Government.

It is apparent that many modifications and variations of this invention as hereinbefore set forth may be made without departing from the spirit and scope thereof. The specific embodiments described are given by way of example only and the invention is limited only by the terms of the appended claims.

We claim:
1. A membrane fluid exchange device comprising:
 (A) a plurality of stacked generally flat rigid membrane support plates,
 (B) flat spacer means disposed between each adjacent pair of said plates to hold said plates closely spaced apart,
 (C) a thin membrane disposed between each of said membrane support plates and each of said spacer means,
 (D) a plurality of projections on each face of said membrane support plates to support and hold said membrane spaced from said plate and to maintain constant spacing between adjacent membrane surfaces,
 (E) means for introducing one fluid for flow as a thin film between the two layers of membrane between each adjacent pair of membrane support plates and means for discharging said fluid therefrom, and
 (F) means for introducing another fluid for flow through the space between each membrane support plate and adjacent membrane layer and means for discharging said fluid therefrom.

2. A membrane fluid exchange device according to claim 1 further characterized in that said membrane is in the form of an elongated strip in pleated form extending alternately around each membrane support plate and around each of said spacer means.

3. A membrane fluid exchange device according to claim 1 further characterized in that said membrane supporting projections include:
 (A) a plurality of minute evenly spaced apart pedestals,
   (1) the pedestals on one face of said membrane support plate being positioned to mate with corresponding pedestals on the opposite face of the next adjacent plate, and
 (B) a much larger plurality of minute evenly spaced apart cones disposed between said pedestals,
   (1) the end of the cones on one face of said membrane support plate being positioned to lie between the ends of the corresponding cones on the opposite face of the next adjacent plate.

4. A membrane fluid exchange device according to claim 3 further characterized in that said cones at the end of said plates adjacent the means for introduction of said first fluid are slightly higher than said cones adjacent the discharge end to compensate for increased pressure.

5. A membrane fluid exchange device according to claim 1 further characterized in that
 (A) each of said membrane support plates includes an elongated cavity extending across the top portion of each plate on each face and another similar elongated cavity extending across the bottom portion of each plate on each face,
 (B) said cavities in the opposed faces of adjacent plates defining channels into which the thin membrane may be distended under pressure of said first fluid to provide fluid distribution and fluid collection channels, respectively.

6. A membrane fluid exchange device according to claim 5 further characterized in that
 (A) each of said membrane support plates is provided with a channel-defining edge recess on each face thereof,
 (B) one of said recesses being in alignment with one of said top elongated cavities but not in communication therewith,
 (C) the other of said recesses being on the same edge but opposite face and in alignment with one of said bottom elongated cavities but not in communication therewith, and
 (D) said spacer means having a pair of passages therethrough along one side thereof,
 (E) each of said passages being in registry with the end of one of said elongated cavities in one plate and with the end of one of said recesses in the opposed face of the next adjacent plate.

7. A membrane fluid exchange device according to claim 1 further characterized in that
 (A) each of said membrane support plates includes an elongated shallow fluid distribution channel extending across the bottom portion of each plate on each face for distribution of said other fluid, and another similar elongated shallow fluid collection channel extending across the top portion of each plate on each face, and
(B) said channels on the same face of the plate being connected by the passage defined between the plate surface and membrane surface in the spaces between the projections supporting the membrane spaced from the plate surface.

8. A membrane fluid exchange device according to claim 7 further characterized in that
(A) each of said membrane support plates is provided with a short recessed edge channel on each face thereof but not in direct communication with one of the elongated channels on the same face,
(B) the inner end of each of said channels communicates through a passage through said plate with one of said elongated channels on the opposite face of said plate, and
(C) said elongated channels on opposite sides of said plate are connected through a plurality of passages extending through the plate spaced along the length of the channels.

9. A membrane fluid exchange device according to claim 1 further characterized in that said membrane is permeable to the passage of oxygen and carbon dioxide and impermeable to the passage of blood, being composed of multi-ply laminated silicone rubber film of about 1 mil thickness.

10. A membrane fluid exchange device according to claim 1 further characterized in that a plurality of spaced apart means are provided for introducing streams of each of said fluids into the spaces, respectively, between said membrane layers and between the membrane and membrane support and a plurality of alternating spaced apart means are provided for discharging said fluid from said spaces in a plurality of alternating spaced apart streams.

References Cited

UNITED STATES PATENTS

| | | | |
|---|---|---|---|
| 3,077,268 | 2/1963 | Gobel et al. | 210—321 |
| 3,212,642 | 10/1965 | Kylstra | 210—321 |
| 3,266,629 | 8/1966 | Megibow | 210—321 |

OTHER REFERENCES

Bluemle, Jr. et al., "A Compact Blood Dialyzer Without Membrane Supports: Design and Fabrication," from Transactions Amer. Soc. for Artificial Internal Organs, vol. XI, pp. 157–160, held April 9 and 10, 1965, Atlantic City, N.J. Received in Patent Office July 15, 1965. Copies may be ordered from Dr. George E. Schreiner, Dept. of Medicine, Georgetown University Hospital, Washington, D.C.

Cole et al., "The Pumpless Low Temperature Hemodialysis System," from Transactions Amer. Soc. for Artificial Internal Organs, pp. 209–211 and 215–217, held Apr. 13–14, 1962, Atlantic City, N.J., received in Patent Office May 28, 1962.

REUBEN FRIEDMAN, *Primary Examiner.*

F. SPEAR, *Assistant Examiner.*